United States Patent
Johnson et al.

(10) Patent No.: US 12,112,649 B2
(45) Date of Patent: Oct. 8, 2024

(54) AUTOMATIC AUTOLAND ACTIVATION METHODS AND SYSTEMS

(71) Applicant: HONEYWELL INTERNATIONAL INC., Charlotte, NC (US)

(72) Inventors: Michael Blaine Johnson, Phoenix, AZ (US); Michael Mast, Phoenix, AZ (US); Jan Urbanec, Brno (CZ); Emmanuel Letsu-Dake, Plymouth, MN (US); Nichola Lubold, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 286 days.

(21) Appl. No.: 17/411,957

(22) Filed: Aug. 25, 2021

(65) Prior Publication Data
US 2022/0406201 A1    Dec. 22, 2022

Related U.S. Application Data

(60) Provisional application No. 63/213,445, filed on Jun. 22, 2021.

(51) Int. Cl.
G08G 5/02    (2006.01)
G08G 5/00    (2006.01)

(52) U.S. Cl.
CPC ........... *G08G 5/025* (2013.01); *G08G 5/0021* (2013.01); *G08G 5/0039* (2013.01); *G08G 5/0056* (2013.01)

(58) Field of Classification Search
CPC .... G08G 5/025; G08G 5/0021; G08G 5/0039; G08G 5/0056; G05D 1/0055; B64D 45/00
See application file for complete search history.

(56) References Cited

U.S. PATENT DOCUMENTS 6,507,776 B1    1/2003    Fox, III
6,739,556 B1    5/2004    Langston
(Continued)

FOREIGN PATENT DOCUMENTS

EP    2434465 A2    3/2012
EP    3459857 A1    3/2019
(Continued)

OTHER PUBLICATIONS

Lardinois, Frederic, "With Garmin Autoland, Small Planes Can Land Themselves If Pilot Becomes Incapacitated," https://techcrunch.com/2019/10/31/with-garmin-autoland-small-planes-can-land-themselves-if-the-pilot-becomes-incapacitated/, downloaded on Jun. 29, 21.
(Continued)

*Primary Examiner* — Aniss Chad
*Assistant Examiner* — Chase L Cooley
(74) *Attorney, Agent, or Firm* — Lorenz & Kopf LLP

(57) ABSTRACT

Methods and systems are provided for assisting operation of a vehicle by automatically initiating activation of an automated functionality, such as autoland functionality of an aircraft, in the absence of user input within one or more monitoring periods. One method involves identifying a triggering event, identifying a monitoring period associated with the triggering event, monitoring one or more components for user input within the monitoring period associated with the triggering event, and automatically initiating activation of an automated functionality associated with the vehicle in the absence of user input within the monitoring period associated with the triggering event. In some implementations, the monitoring period adaptively and dynamically varies during operation.

14 Claims, 9 Drawing Sheets

(56) References Cited

U.S. PATENT DOCUMENTS

| | | | |
|---|---|---|---|
| 7,183,946 B2 | 2/2007 | Boudrieau | |
| 7,343,232 B2 | 3/2008 | Duggan et al. | |
| 7,568,662 B1 | 8/2009 | Conner | |
| 7,693,614 B2 | 4/2010 | Turung | |
| 7,715,955 B2 | 5/2010 | Tatham et al. | |
| 7,792,615 B2 | 9/2010 | Aimar | |
| 7,896,293 B2 | 3/2011 | Boissenin et al. | |
| 8,032,267 B1 | 10/2011 | Simon | |
| 8,108,086 B2 | 1/2012 | Bailly et al. | |
| 8,180,503 B2 | 5/2012 | Estabrook et al. | |
| 8,527,118 B2 | 9/2013 | Jones et al. | |
| 8,761,965 B2 | 6/2014 | Righi et al. | |
| 8,866,623 B2 | 10/2014 | Sharon | |
| 8,948,936 B2 | 2/2015 | Shue et al. | |
| 9,310,222 B1 | 4/2016 | Suiter et al. | |
| 9,688,246 B2 | 6/2017 | Kleve et al. | |
| 9,701,418 B2 | 7/2017 | Nelson et al. | |
| 9,771,081 B2 | 9/2017 | Grube et al. | |
| 9,786,189 B2 | 10/2017 | Loussides et al. | |
| 10,114,381 B2 | 10/2018 | Haskins et al. | |
| 10,203,700 B2 | 2/2019 | Haskins et al. | |
| 10,242,580 B2 | 3/2019 | Groden et al. | |
| 10,426,393 B2 | 10/2019 | Bosworth et al. | |
| 10,467,913 B1 | 11/2019 | Suiter et al. | |
| 10,540,904 B2 | 1/2020 | Ouellette | |
| 10,620,641 B2 | 4/2020 | Haskins et al. | |
| 10,766,605 B2 | 9/2020 | Offredi et al. | |
| 11,176,833 B1 | 11/2021 | McGaughy et al. | |
| 2003/0034902 A1 | 2/2003 | Dickau | |
| 2003/0083804 A1* | 5/2003 | Pilley | G08G 5/0013 |
| | | | 342/36 |
| 2005/0030184 A1 | 2/2005 | Victor | |
| 2007/0050100 A1 | 3/2007 | Gustafson et al. | |
| 2007/0055434 A1 | 3/2007 | Kohlmann | |
| 2008/0039988 A1 | 2/2008 | Estabrook et al. | |
| 2010/0004803 A1 | 1/2010 | Manfredi et al. | |
| 2010/0305786 A1 | 12/2010 | Boorman | |
| 2011/0224849 A1 | 9/2011 | Braly et al. | |
| 2013/0179011 A1 | 7/2013 | Colby et al. | |
| 2015/0032299 A1 | 1/2015 | Puyou et al. | |
| 2015/0123820 A1 | 5/2015 | Merle et al. | |
| 2016/0027336 A1 | 1/2016 | Towers et al. | |
| 2016/0139603 A1 | 5/2016 | Bianchi et al. | |
| 2017/0092137 A1 | 3/2017 | Hiebl | |
| 2017/0249852 A1 | 8/2017 | Haskins et al. | |
| 2017/0277201 A1 | 9/2017 | Brendenbeck et al. | |
| 2018/0148192 A1 | 5/2018 | Haskins et al. | |
| 2018/0222602 A1 | 8/2018 | Salesse-Lavergne | |
| 2018/0304993 A1* | 10/2018 | Offredi | B64D 45/0056 |
| 2018/0364707 A1 | 12/2018 | Bosworth et al. | |
| 2019/0090800 A1 | 3/2019 | Bosworth et al. | |
| 2019/0094886 A1 | 3/2019 | Haskins et al. | |
| 2019/0129448 A1 | 5/2019 | Haskins et al. | |
| 2019/0378422 A1 | 12/2019 | Rankin et al. | |
| 2019/0392719 A1 | 12/2019 | Parker et al. | |
| 2020/0183382 A1 | 6/2020 | Schwindt | |
| 2020/0239004 A1 | 7/2020 | Sobhany | |
| 2020/0387172 A1 | 12/2020 | Haskins et al. | |
| 2021/0004617 A1 | 1/2021 | Gouraud et al. | |
| 2021/0034053 A1 | 2/2021 | Nikolic et al. | |
| 2022/0397918 A1* | 12/2022 | Krenz | G06F 3/0484 |

FOREIGN PATENT DOCUMENTS

| | | |
|---|---|---|
| GB | 2543503 A | 4/2017 |
| KR | 1016632922 B1 | 10/2016 |
| WO | 2012145608 A1 | 10/2012 |

OTHER PUBLICATIONS

Thurber, Matt, "Autoland Is Garmin's Newest Safety Feature," General Aviation, Oct. 30, 2019.

Garmin, "Autonomi Autonomous Safety-Enhancing Technologies," downloaded from https://discover.garmin.com/en-US/autonomi/#edm on Jun. 29, 2021.

Garmin, "Autonomi Autonomous Safety-Enhancing Technologies," downloaded from https://discover.garmin.com/en-US/autonomi/#esp on Jun. 29, 2021.

Abbas, Q.; Alsheddy, A., Driver Fatigue Detection Systems Using Multi-Sensors, Smartphone, and Cloud-Based Computing Platforms: A Comparative Analysis. Sensors 2021, 21, 56. https://dx.doi.org/10.3390/s21010056, Dec. 24, 2020.

* cited by examiner

AUTOMATIC AUTOLAND ACTIVATION METHODS AND SYSTEMS

CROSS-REFERENCE TO RELATED APPLICATION(S)

This application claims the benefit of U.S. Provisional Patent Application Ser. No. 63/213,445, filed Jun. 22, 2021, the contents of which are incorporated by reference herein in its entirety.

TECHNICAL FIELD

The subject matter described herein relates generally to vehicle systems, and more particularly, embodiments of the subject matter relate to flight guidance systems and methods for autonomously initiating automated landing functionality for an aircraft.

BACKGROUND

Various forms of automation have been incorporated into vehicles to improve operations and reduce stress, fatigue, and other potential contributing factors for human error. For example, many modern aircraft incorporate a flight management system (FMS) and other avionics systems capable of providing autopilot functionality and other automated vehicle operations. While various forms of automation have been incorporated into vehicles such as aircraft, a vehicle operator often has to manually operate the vehicle in response to abnormal events or various other conditions or scenarios. However, in some situations, a pilot or other vehicle operator may become distracted, incapacitated or otherwise impaired with respect to his or her ability to operate the vehicle (e.g., due to workload, loss of situational awareness, health emergencies, etc.). Accordingly, it is desirable to provide aircraft systems and methods for mitigating potential pilot incapacity or other inability to fully operate the aircraft. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle in the event of a potential incapacity condition. One method involves identifying occurrence of a triggering event indicative of a potential incapacity condition with respect to a vehicle operator for triggering an automated functionality associated with a vehicle, identifying a monitoring period associated with the triggering event, and monitoring one or more components for user input or other activity by the vehicle operator within the monitoring period associated with the triggering event. Activation of an automated functionality associated with the vehicle is automatically initiated in an absence of user input within the monitoring period associated with the triggering event.

In one embodiment, a method of automatically activating an autoland functionality of an aircraft is provided. The method involves identifying a current flight phase of the aircraft, identifying a monitoring period associated with the current flight phase, and monitoring one or more components onboard the aircraft for user input within the monitoring period associated with the current flight phase. The method continues by identifying occurrence of a potential triggering event for the autoland functionality while monitoring the one or more components for user input within the monitoring period associated with the current flight phase, reducing the monitoring period by a scaling factor associated with the potential triggering event in response to the occurrence of the potential triggering event to obtain a reduced monitoring period, and automatically initiating activation of the autoland functionality of the aircraft in response to an absence of user input within the reduced monitoring period.

In another embodiment, a computer-readable medium having computer-executable instructions stored thereon is provided. When executed by a processing system, the computer-executable instructions cause the processing system to identify a first triggering event associated with operation of a vehicle, identify a monitoring period associated with the first triggering event, monitor one or more components onboard the vehicle for user input within the monitoring period associated with the first triggering event, identify occurrence of a second triggering event associated with operation of the vehicle while monitoring the one or more components for user input within the monitoring period associated with the first triggering event, reduce the monitoring period by a scaling factor associated with the second triggering event in response to the occurrence of the second triggering event to obtain a reduced monitoring period, and automatically initiate activation of an automated functionality of the vehicle in response to an absence of user input within the reduced monitoring period.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
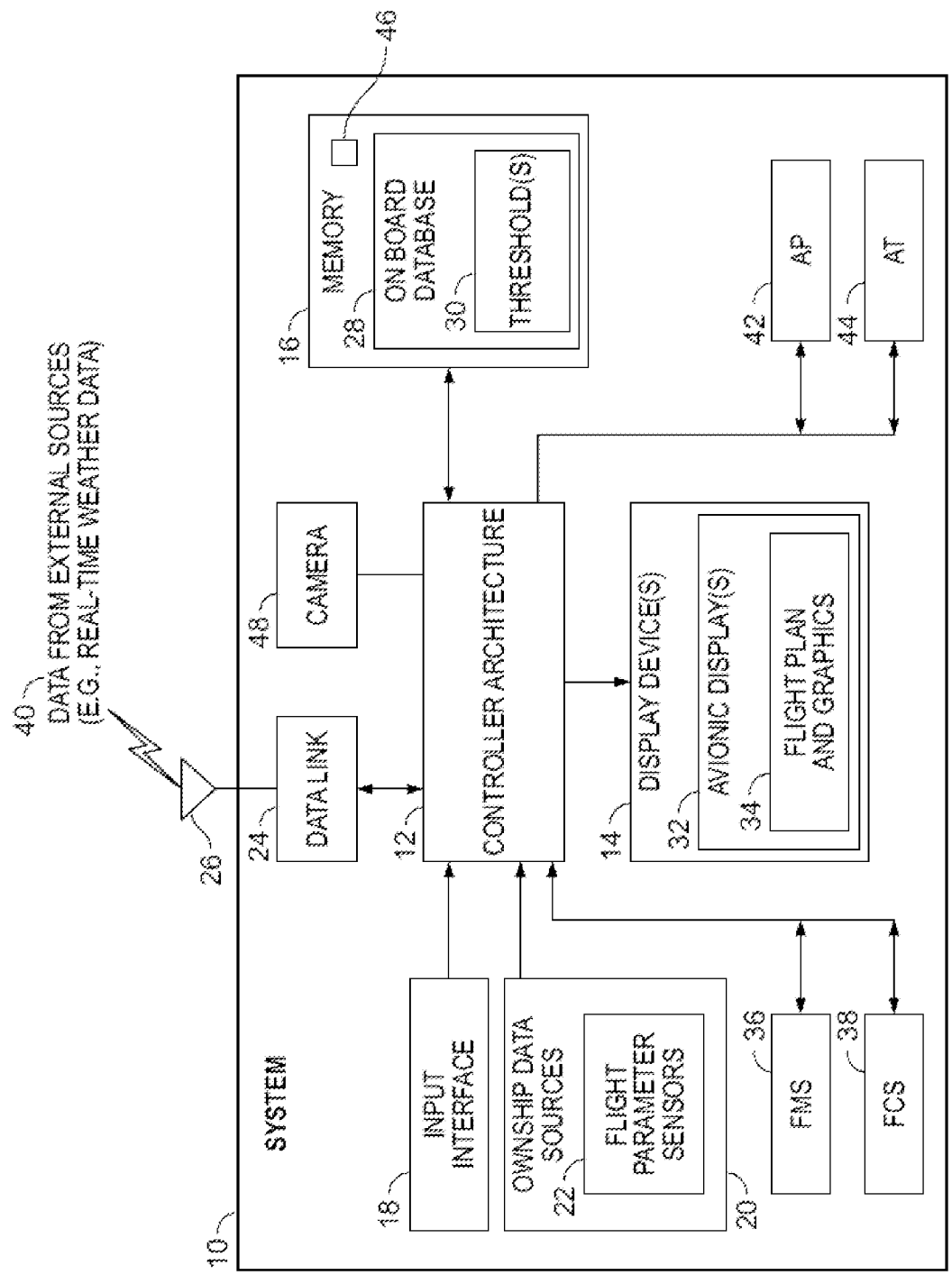
FIG. 1 is a block diagram illustrating a guidance system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods that facilitate autonomously and automatically activating autonomous assisted landing functionality for an aircraft. For example, as described in U.S. patent application Ser. No. 17/180,954, filed Feb. 22, 2021, which is incorporated by reference herein in its entirety, an aircraft may be equipped with an auto land function or an emergency land function (alternatively referred to herein as autoland functionality) that provides fully autonomous and automatic configuration of the aircraft for landing, and provide automatic flare and centerline guidance to a full stop condition.

Autoland functionality drastically improves the safety of passengers onboard a single pilot aircraft; however, in practice, in order to achieve a safe emergency landing, a passenger onboard the aircraft may need to be aware of the pilot's incapacitation state and trained on how to manually activate the autoland functionality. Accordingly, for situations where there is single pilot operation with no passengers, young passengers, inattentive passengers and/or passengers who are otherwise inexperienced with the autoland functionality, it is desirable to provide a means for activating the autoland functionality in an automated manner without potential human error or lapses. Accordingly, the subject matter described herein provides pilot incapacitation monitoring methods and systems for automatically and autonomously activating the autoland functionality without requiring involvement of any onboard passengers to activate the autoland functionality. Furthermore, even in situations where experienced and attentive passengers are onboard and capable of activating the autoland functionality, the pilot incapacitation monitoring methods and systems may more expeditiously activate or otherwise initiate the autoland functionality before passengers realize the pilot is incapacitated, thereby reducing the amount of time between a pilot becoming incapacitated and the activation of the autoland functionality, which, in turn, may also expedite the pilot or other individuals onboard the aircraft receiving medical attention.

As described in greater detail below, the pilot incapacitation monitoring processes described herein monitor the pilot interactions and activity across a variety of different input devices, interface elements and/or other onboard systems to detect or otherwise identify a potential incapacitation event (or condition) based on the absence of a pilot interaction within a threshold duration of time. When a potential incapacitation event (or condition) is detected, one or more notifications or alerts may be provided in a progressively escalating manner to encourage pilot interaction before automatically and autonomously activating the autoland functionality in response to the absence of pilot interaction or activity over a preceding period of time.

For purposes of explanation, the subject matter may be primarily described herein in the context of autonomously landing an aircraft in the event of pilot incapacity; however, the subject matter described herein is not necessarily limited to aircraft or avionic environments, and in alternative embodiments, may be implemented in an equivalent manner for automobiles or ground operations, vessels or marine operations, or otherwise in the context of other types of vehicles and travel spaces to autonomously operate the vehicle in the event of operator incapacity (e.g., automatically parking an automobile when a driver is incapacitated, automatically docking a ship when a captain or other crew member in control is incapacitated, etc.).

It will be appreciated that the subject matter described herein is advantageous in numerous different scenarios. For example, in single pilot operation without passengers, if the pilot becomes incapacitated and unable to land the aircraft while no one else is onboard, the pilot incapacitation monitoring process will be able to detect the incapacitation and activate autoland functionality without any human inputs to save the aircraft and potentially the pilot. As another example, for single pilot operation where the pilot becomes incapacitated and unable to land the aircraft, and the pilot did not previously brief the passengers about the emergency autoland functionality available onboard the aircraft, the pilot incapacitation monitoring process will be able to detect the incapacitation and activate the autoland functionality without any human inputs and save the aircraft, passengers, and potentially the pilot. Similarly, for single pilot operations where the passengers are unaware the pilot is incapacitated or for operations where all pilots and passengers are incapacitated (e.g., due to cabin depressurization), the pilot incapacitation monitoring process will be able to detect the incapacitation and activate the autoland functionality without any human inputs to save the aircraft and potentially the pilot(s) and/or passenger(s).

FIG. 1 depicts an exemplary embodiment of a flight guidance system 10 suitable for use with an aircraft to provide an autoland functionality (or emergency land functionality) for an aircraft. As described in greater detail below, in exemplary embodiments, the pilot incapacitation monitoring processes described herein are configurable to automatically activate or otherwise initiate the autoland functionality in an autonomous manner (e.g., without requiring manual engagement by a crew member, passenger, or other individual onboard the aircraft) when a pilot incapacitation event (or condition) is detected. When the autoland functionality is activated, the flight guidance system 10 is fully autonomous, that is, the flight guidance system 10 autonomously and automatically configures the aircraft for landing and provides automatic flare and centerline guidance to a full stop condition.

As schematically depicted in FIG. 1, flight guidance system 10 includes the following components or subsystems, each of which may assume the form of a single device or multiple interconnected devices: a controller architecture 12, at least one display device 14, computer-readable storage media or memory 16, a pilot input interface 18, an automatic-pilot system (AP) 42 and an automatic throttle system (AT) 44. Flight guidance system 10 may further contain ownship data sources 20 including on-board sensors of temperature, humidity, pressure, and the like. In various embodiments, ownship data sources include an array of flight parameter sensors 22. In various embodiments, flight guidance system 10 includes a camera 48 oriented in a cockpit to take pictures of the user/pilot.

The flight guidance system 10 may be separate from or integrated with: a flight management system (FMS) 36 and a flight control system (FCS) 38. Flight guidance system 10 may also contain a datalink subsystem 24 including an antenna 26, which may wirelessly transmit data to and receive data (40) from various sources external to system 10, such as a cloud-based weather (WX) forecasting service of the type discussed below.

Although schematically illustrated in FIG. 1 as a single unit, the individual elements and components of flight guidance system 10 can be implemented in a distributed manner utilizing any practical number of physically-distinct and operatively-interconnected pieces of hardware or equipment.

The term "controller architecture," as appearing herein, broadly encompasses those components utilized to carry-out or otherwise support the processing functionalities of flight guidance system 10. Accordingly, controller architecture 12 can encompass or may be associated with any number of individual processors, flight control computers, navigational equipment pieces, computer-readable memories (including or in addition to memory 16), power supplies, storage devices, interface cards, and other standardized components. In various embodiments, controller architecture 12 is embodied as an enhanced computer system that includes or cooperates with at least one firmware and software program 46 (generally, computer-readable instructions that embody an algorithm) for carrying-out the various process tasks, calculations, and control/display functions described herein. During operation, the controller architecture 12 may be pre-programmed with, or load and then execute the at least one firmware or software program 46 to thereby perform the various process steps, tasks, calculations, and control/display functions described herein.

Controller architecture 12 may utilize the datalink 24 to exchange data with one or more external sources 40 to support operation of flight guidance system 10 in embodiments. In various embodiments, the datalink 24 functionality is integrated within the controller architecture 12. In various embodiments, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 can encompass any number and type of storage media suitable for storing computer-readable code or instructions, such as the aforementioned software program, as well as other data generally supporting the operation of flight guidance system 10. In certain embodiments, memory 16 may contain one or more databases 28, such as geographical (terrain), airport features database (providing runways and taxiways), navigational, and historical weather databases, which may be updated on a periodic or iterative basis to ensure data timeliness. The databases maintained in memory 16 may be shared by other systems onboard the aircraft carrying flight guidance system 10, such as an Enhanced Ground Proximity Warning System (EGPWS) or a Runway Awareness and Advisory System (RAAS). Memory 16 may also store the software program 46 and/or one or more threshold values, as generically represented by box 30. In various embodiments, the controller architecture 12 has integrated therein suitable memory for processing calculations and for storing the software program 46 and/or the thresholds 30.

Flight parameter sensors 22 supply various types of data or measurements to controller architecture 12 during aircraft flight. In various embodiments, flight parameter sensors 22 provide data and measurements from a Full Authority Digital Engine Control (FADEC), such data or measurements may include engine status (e.g., an engine-out (EO) condition signal) and fuel flow to the engine. In aircraft not having a FADEC, engine status and fuel flow may be determined based on monitored generator current in the engine.

In various embodiments, the flight parameter sensors 22 also supply aircraft status data for the aircraft, including, without limitation: airspeed data, groundspeed data, altitude data, attitude data including pitch data and roll measurements, heading information, flight track data, inertial reference system measurements, Flight Path Angle (FPA) measurements, and yaw data. In various embodiments, aircraft status data for the aircraft also includes one or more of: flight path data, data related to aircraft weight, time/date information, remaining battery time, data related to atmospheric conditions, radar altitude data, geometric altitude data, wind speed and direction data. Further, in certain embodiments of system 10, controller architecture 12 and the other components of flight guidance system 10 may be included within or cooperate with any number and type of systems commonly deployed onboard aircraft including, for example, an FMS 36, an Attitude Heading Reference System (AHRS), an Instrument Landing System (ILS), and/or an Inertial Reference System (IRS), to list but a few examples.

With continued reference to FIG. 1, display device 14 can include any number and type of image generating devices and respective display drivers to generate one or more avionic displays. The display device 14 can embody a touch-screen display. When flight guidance system 10 is utilized to construct flight plans for a manned aircraft, display device 14 may be affixed to the static structure of the aircraft cockpit as, for example, a Head Down Display (HDD) or Head Up Display (HUD) unit. Alternatively, display device 14 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 32 is generated on display device 14 during operation of flight guidance system 10; the term "avionic display" defined as synonymous with the term "aircraft-related display" and encompassing displays generated in textual, graphical, cartographical, and other formats. Avionic display 32 is generated to include various visual elements or flight plan graphics 34, which may be referenced by a pilot during the EO condition. The graphics 34 can include, for example, textual readouts relating to airport selection criteria or text annunciations indicating whether flight guidance system 10 is able to select an airport satisfying such airport selection criteria. The avionic display or displays 32 generated by flight guidance system 10 can include alphanumerical input displays of the type commonly presented on the screens of MCDUs, as well as Control Display Units (CDUs) generally. The avionic display or displays 32 generated by flight guidance system 10 can also generate various other types of displays on which symbology, text annunciations, and other graphics pertaining to flight planning Embodiments of flight guidance system 10 can generate graphics 34 on one or more two dimensional (2D) avionic displays, such a horizontal or vertical navigation display; and/or on one or more three dimensional (3D) avionic displays, such as a Primary Flight Display (PFD) or an exocentric 3D avionic display. In some embodiments, the display device(s) 14 have integrated therein the necessary drivers and audio devices to additionally provide aural alerts, emitting sounds and speech.

Via various display and graphics systems processes, the graphics 34 on the avionic display or displays 32 can include a displayed button to activate the functions and various alphanumeric messages overlaid on a lateral display or a vertical display. The avionic display or displays 32 generated by flight guidance system 10 can also generate various other types of displays on which symbology, text annunciations, and other graphics pertaining to flight planning Embodiments of flight guidance system 10 can generate graphics 34 on one or more two dimensional (2D) avionic displays, such a horizontal or vertical navigation display; and/or on one or more three dimensional (3D) avionic displays, such as a Primary Flight Display (PFD) or an exocentric 3D avionic display.

In various embodiments, a human-machine interface (HMI), such as the above described touch screen display, is implemented as an integration of the user interface 18 and a display device 14. Via various display and graphics systems processes, the controller circuit 12 may command and control the touch screen display generating a variety of graphical user interface (GUI) objects or elements described herein, including, for example, buttons, sliders, and the like, which are used to prompt a user to interact with the HMI to provide user input, and to activate respective functions and provide user feedback, responsive to received user input at the GUI element.

In various embodiments, one or more of the pilot incapacitation monitoring process steps described herein are embodied in an algorithm encoded into a software program 46 and executed as computer-implemented functions or process steps, such as, by the controller architecture 12. In some embodiments, the process steps are aggregated into larger process blocks, and the controller architecture 12 directs or delegates the aggregated larger process blocks to various systems on-board the aircraft to perform. In various embodiments, the process blocks are referred to as modules. In various embodiments, the controller architecture 12 first determines whether the auto land mode is available before initiating the pilot incapacitation monitoring processes, e.g., when a current altitude of the aircraft exceeds a first altitude threshold; and, responsive thereto, the controller architecture 12 generates and displays one or more visual indications and aural alerts that indicate the availability of auto land and emergency land modes, their engagement status (i.e. engaged, failed, etc.) consistent with current cockpit philosophy. CAS (Crew Alerting System) alerting is provided when autoland functionality is attempted to be engaged but is unavailable. For example, autoland functionality may only be available after the system 10 determines that the aircraft has cleared (i.e., a current altitude of the aircraft exceeds) a preprogrammed minimum altitude, to avoid nuisance activation during a takeoff phase of flight. This preprogrammed minimum altitude may be referred to as a minimum armed height.

In exemplary embodiments, the controller architecture 12 activates autoland functionality responsive to the pilot incapacitation monitoring process determining the autoland functionality should be activated in the absence of user input or other pilot activity, as described in greater detail below in the context of FIGS. 2-9. In some embodiments, the cockpit camera 48 may be utilized to verify or otherwise confirm a pilot incapacitation event or condition detected by the pilot incapacitation monitoring process, for example, by obtaining an eyelid position or pupil dilation input, via a cockpit camera 48, and processing this input with visual algorithms included in program 46 to measure of pilot incapacitation. Responsive to the detection of a pilot incapacitation condition, in some embodiments, the controller architecture 12 may generate a prompt for the pilot to manually respond or interact with the system 10 to cancel an impending automatic activation of the autoland functionality prior to the automatic activation of the autoland functionality. In one embodiment, the prompt is a GUI object with a timer countdown that is displayed while counting down.

In various embodiments, responsive to automated activation of the autoland functionality, the FCS 38 automatically activates the AT 44 and AP 42 functions, and the controller architecture 12 begins the begins commanding the AP 42 and AT 44 to land the aircraft. In exemplary embodiments, responsive to activation of the autoland functionality, the controller architecture 12 automatically generates a flight plan for autonomously landing the aircraft, for example, by determining a best airport and approach type/profile by processing inputs such as terrain, obstacles, weather, aircraft-specific approach capabilities, runway lengths, range, on-ground weather conditions, etc., using a runway algorithm in program 46. In some embodiments, the controller architecture 12 generates commands for leveling the aircraft while the flight plan is being updated prior to actively controlling the AP 42 and AT 46 to land the aircraft at the selected airport, in accordance with the resulting flight plan. For example, the controller architecture 12 may command the FCS 38 to activate a flight director lateral mode (annunciated to the crew as ROL) which commands a wings level lateral command, this may also be referred to as ROL (WNG_LVL) and activate flight path angle (FPA) with a target FPA of 0 degrees to level the aircraft and await FMS flight plan activation. When generating the flight plan, the controller architecture 12 may interface with an instrument navigation (INAV) onboard terrain/obstacle database to provide terrain awareness and/or interface with the INAV weather (WX) layers to determine en route weather.

In various embodiments, responsive to activation of the autoland functionality, the controller architecture 12 may select a different airport from a previously selected airport for landing the aircraft if the different airport provides a quicker option and speed is a priority. In this regard, the controller architecture 12 may autonomously and automatically select a nearest suitable airport and an associated route thereto, and then autonomously control the AP and AT to fly the aircraft along the route to a final approach fix before autonomously communicating with air traffic control (ATC), autonomously configuring the aircraft for landing and autonomously landing the aircraft at the nearest suitable airport. In various embodiments, the controller architecture 12 will use GPS altitude for approach calculations when it determines that it cannot be ensured the correct barometric setting has been received. In various embodiments where ILS approach is optimal selection, the controller architecture 12 will automatically tune the NAV radios to the LOC frequency. In various embodiments when LNAV/VNAV becomes active, the controller architecture 12 manages the speed. In the computation of landing performance data, the controller architecture 12 may interface with various third-party off-board products which assist in the automated acquisition of this data, such as Go-direct. Alternatively, in various embodiments, the controller architecture 12 may utilize onboard products, such as satellite weather (SiriusXM) or upgraded ADS-B technology like FIS-B (Flight Information System Broadcast) that require various landing performance data (runway length, winds, temp, etc.) to be entered in to compute the various landing speeds and landing lengths. If the pilot is incapacitated, this cannot be entered, but there are various services the AC may subscribe to (The automatic flight planning service from Go-Direct) which could send digital uplinks to the aircraft to automatically enter this information into the FMS in lieu of pilot. Advantageously, getting this real-time information, rather than just using a 'worst case' assumption, increases the amount of runways the controller architecture 12 could pick because it does not have to throw out possible runways to only include the worst-case acceptable runways. In other embodiments, the algorithm executed by the controller architecture 12 picks an approach and landing airport that has a runway large enough to land the aircraft with a built-in safety-factor, regardless of landing performance data.

During execution of the auto land flight plan, the controller architecture 12 controls flap deployment at appropriate points along the approach profile, for example, by digitally manipulating the flap/flap handle as a tailorable OEM option. Additionally, the controller architecture 12 controls gear deployment at appropriate points along the approach profile, for example, by digitally manipulating the gear/gear handle as a tailorable OEM option. In exemplary embodiments, the controller architecture 12 also controls flare maneuvers, and aligns the aircraft with a runway heading prior to touchdown, for example, by controlling the rudder to keep the aircraft aligned with a runway centerline. If the controller architecture 12 computes that a particular descent and speed profile is required, and the auto-thrust (AT's) are lower-power limited, the controller architecture 12 controls spoiler deployment to increase the descent rate or to slow down the descent rate.

Figure 2:
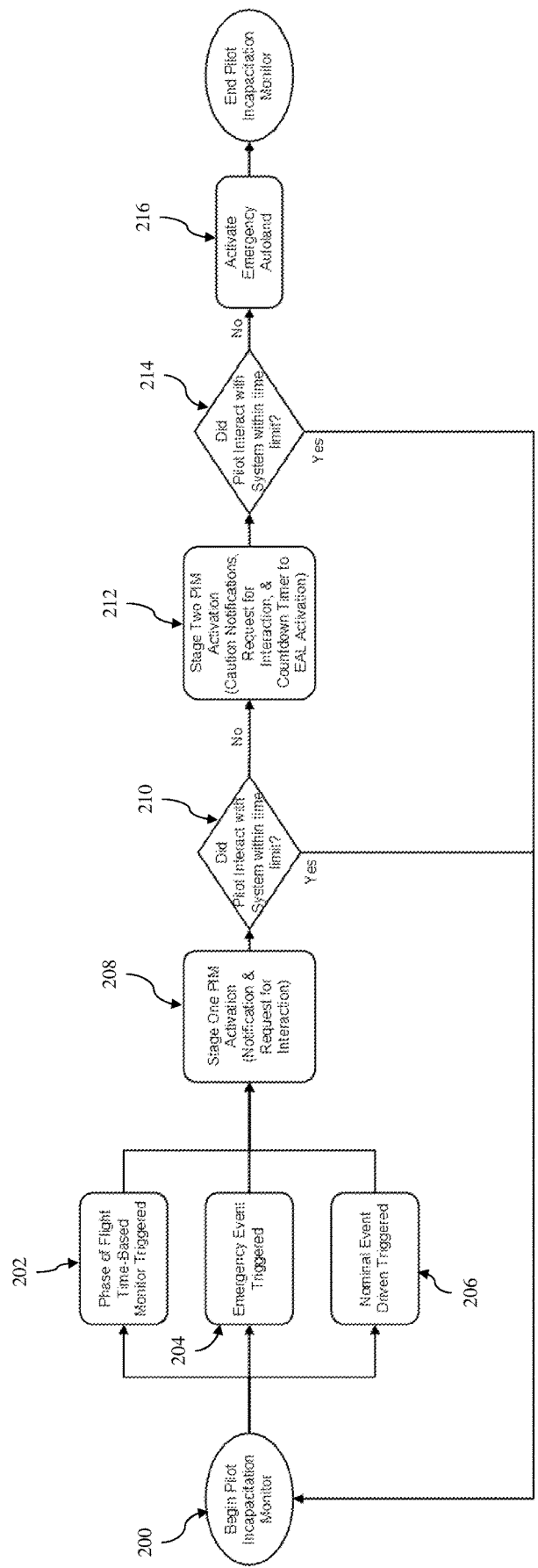
FIG. 2 is a flow diagram illustrating an autoland activation process suitable for use with the guidance system of FIG. 1 in accordance with one or more exemplary embodiments.
Figure 3:
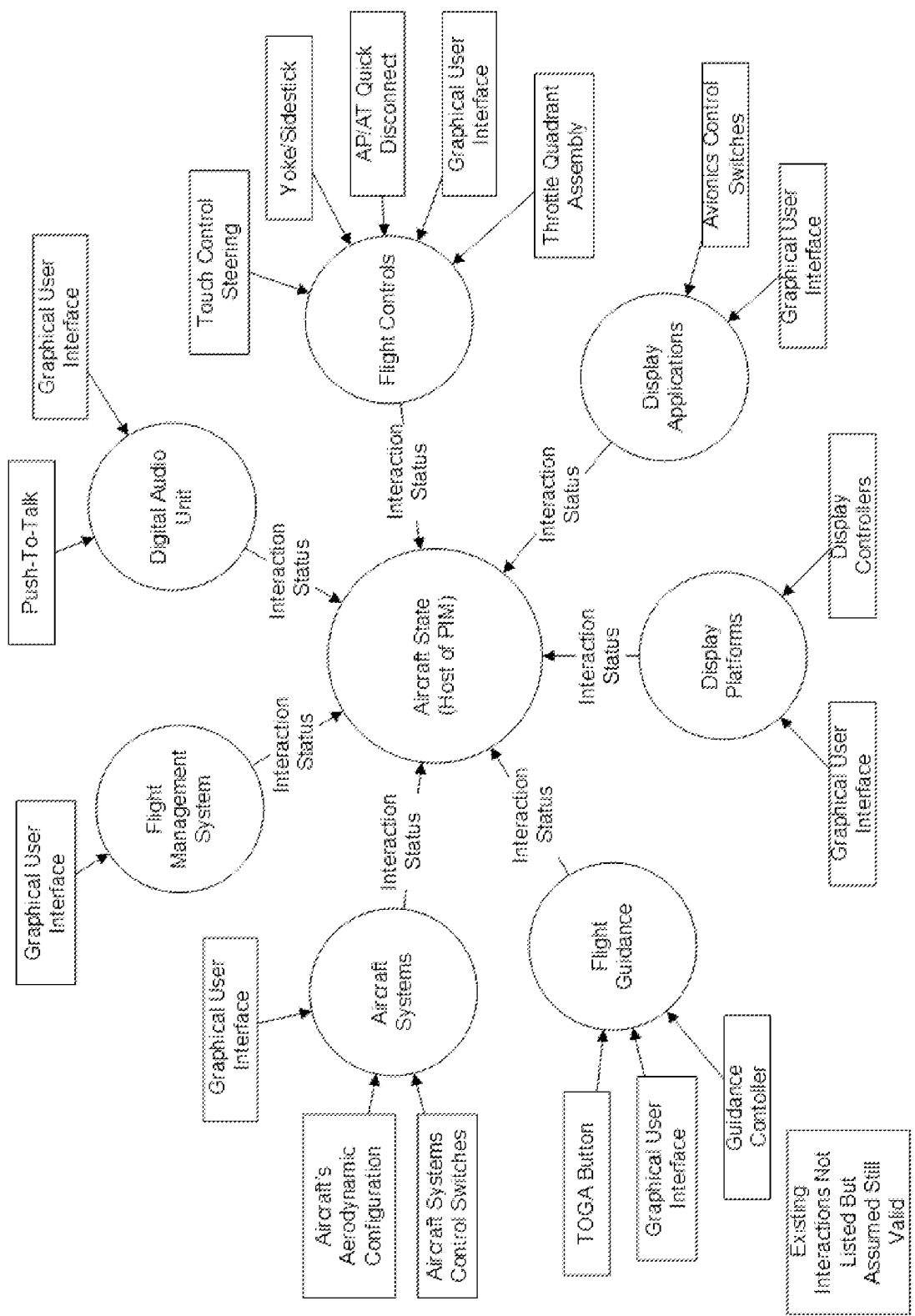
FIG. 3 is a block diagram illustrating an aircraft system suitable for implementing the autoland activation process of FIG. 2 in accordance with one or more exemplary embodiments.

Referring now to FIGS. 2-3, the pilot incapacitation monitoring processes implemented by the flight guidance system 10 and/or the controller architecture 12 employ several types of activity monitors that, in combination, provide a comprehensive pilot incapacitation monitor. In exemplary embodiments, the pilot incapacitation monitoring process automatically begins monitoring (step 200) each flight once the aircraft has climbed above a minimum threshold altitude for enabling the autoland functionality (alternatively referred to as a minimum armed height (MAH)) and automatically stops monitoring each flight when the aircraft descends below that threshold. While the monitoring is active, the pilot incapacitation monitoring processes concurrently monitors for interactions with the flight deck within different, overlapping monitoring periods corresponding to different potential triggering events for activating the autoland functionality. In this regard, absence of pilot activity within the monitoring period following a triggering event may be indicative of a potential incapacity condition of the pilot for which autoland functionality should be activated. As depicted in FIG. 2, exemplary embodiments of the pilot incapacitation monitoring process concurrently perform phase of flight time-based monitoring (step 202), emergency event monitoring (step 204) and nominal event monitoring (step 206) in parallel.

For phase of flight time-based monitoring (step 202), the pilot incapacitation monitoring process monitors for various different types of pilot interactions or behaviors with respect to the flight deck to detect when the pilot fails to interact with one of the monitored parts of the flight deck within a monitoring time period that is specific to the current flight phase of the aircraft. For example, different flight phases may have different monitoring time periods associated therewith that reflect the expected or anticipated frequency of interaction with the flight deck by the pilot. In this regard, the cruise flight phase or another flight phase correlative to lower pilot workload may have a longer monitoring time period for detecting a potential incapacity condition, while a takeoff or approach phase may have a shorter threshold monitoring time period for detecting a potential incapacity condition during operation in those flight phases due to the expected increase in workload and pilot interactions within those flight phases relative to the cruise flight phase.

A non-exhaustive list of pilot behavior or parts of the flight deck that may be monitored using a flight phase-specific threshold monitoring time period may include one or more of the following: interaction with any graphical interactive user interface, interaction with the flight guidance function controller, and interaction with one or more hardware controllers. Example hardware controllers that may be monitored for interaction include one or more of the autopilot quick disconnect button (AP QD), touch control steering (TCS), throttle quadrant assembly (TQA), takeoff/go around (TOGA) button, autothrottle (AT) engage/disengage button, autothrottle quick disconnect button (AT QD), push-to-talk (PTT) button, master warning/master caution (MW/MC) buttons, yoke/sidestick (if direct monitoring of position is available), display control panels, aircraft systems control switches (e.g. electrical, lights, hydraulics, cabin pressurization), and hardware controllers associated with aircraft configuration changes (e.g. high lift devices, landing gear, speed brakes). In this regard, FIG. 3 depicts an exemplary block diagram of onboard devices, systems, and/or components that may be communicatively coupled to and monitored by the device, system or component hosting a pilot incapacity monitoring (PIM) process. In the absence of manual interaction with any of the monitored components of the flight deck within the flight phase-specific threshold monitoring time period, the pilot incapacitation monitoring process detects a potential pilot incapacity event or condition.

Still referring to FIG. 2, for emergency event monitoring (step 204), the pilot incapacitation monitoring process monitors for pilot interactions or behaviors with respect to the flight deck within a threshold time period that is initiated by occurrence of an emergency event. In this regard, based on the expectation that a non-incapacitated pilot would respond to occurrence of the emergency event, the emergency event threshold time period for monitoring may be of shorter duration than the flight phase threshold monitoring time period, for which phase of flight time-based monitoring may be being performed concurrently. For example, the pilot incapacitation monitoring process may be configured to detect potential incapacity when there is no pilot activity within a time period after the aircraft levels off following an emergency descent. Other example events that may trigger or otherwise initiate an emergency event threshold time period for monitoring may include excess tactile feedback activation (e.g., to detect potential incapacity when there is no pilot activity within a time period after a threshold number of tactile user inputs within a preceding time period) or a failure to acknowledge an alert that requires the pilot press a master warning/master caution button within a threshold period of time. As another example, an emergency event threshold time period may be triggered, initiated or otherwise activated when a potential stall is detected (e.g., to detect potential incapacity when there is no pilot activity within a time period after a stall warning or a stall condition). In the absence of manual interaction with any of the monitored components of the flight deck within the emergency event threshold monitoring time period after occurrence of a potential emergency event, the emergency event monitoring detects a potential pilot incapacity event or condition.

For nominal event monitoring (step 206), the pilot incapacitation monitoring process monitors for pilot interactions or behaviors with respect to the flight deck within a threshold time period that is initiated by occurrence of an event that is not necessarily an emergency but could be indicative of incapacity, which may alternatively be referred to herein as a nominal event. For example, some events that may trigger or otherwise initiate a nominal event threshold time period for monitoring may include cross track error (e.g., when the aircraft deviates from a previously entered flight plan by at least a threshold amount or duration of time), absence of pilot annunciations or other responses to ATC communications (e.g., in an aircraft equipped with ATC voice recognition, when the system hears the tail number or flight ID of the ownship aircraft called by ATC without a response from the pilot), flight past the top of descent (TOD) point by at least a threshold amount of time or distance (e.g., when the aircraft fails to descend as expected based on the flight plan within an acceptable threshold period of time after traversing the TOD point), or unopened or unread messages sent to the ownship aircraft (e.g., when the pilot does not open a received controller-pilot datalink communication (CPDLC) message within a threshold amount of time). In the absence of manual interaction with any of the monitored components of the flight deck within the nominal event threshold monitoring time period after occurrence of a triggering nominal event, the nominal event monitoring detects a potential pilot incapacity event or condition.

In one or more exemplary embodiments, a logical OR operation is performed on the output of the different concurrent monitors (202, 204, 206) so that when any one of the event driven monitors (204, 206) has been triggered or otherwise activated, a potential pilot incapacity event or condition is detected and the process advances to a first stage (or phase) of the autoland functionality activation (step 208). That said, in some alternative embodiments, a logical AND operation is performed on the output of the different concurrent monitors (202, 204, 206) so that when one or more of the event driven monitors (204, 206) has been triggered or otherwise activated, each of the flight phase time-based monitoring (202) and the activated event monitoring (204, 206) must provide output indicative of a potential pilot incapacity event or condition before advancing to a first stage (or phase) of the autoland functionality activation (step 208).

Figure 4:
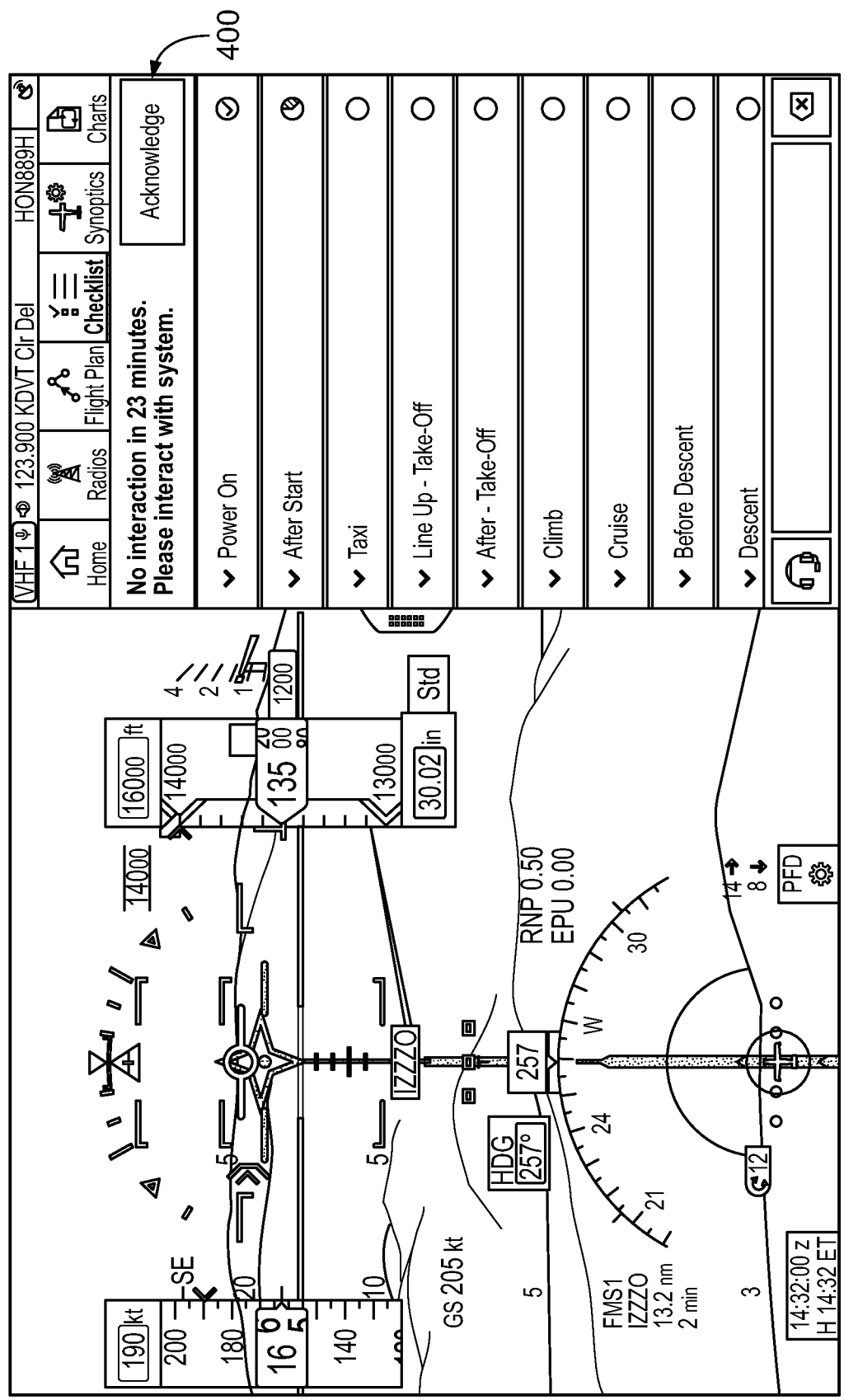
FIGS. 4-5 depict exemplary graphical user interface (GUI) displays that may be presented in connection with the autoland activation process of FIG. 2 in accordance with one or more exemplary embodiments.

When the first stage of the autoland functionality is activated (step 208), the pilot incapacitation monitoring process generates or otherwise provides a notification message on one or more displays onboard the aircraft that requests or otherwise prompts the pilot to interact with the system 10. For example, as shown in FIG. 4, a text box, pop-up window, or another suitable GUI element 400 may be displayed or otherwise rendered on or overlying a primary flight display (PFD) or another avionic display. The GUI notification 400 includes text or other informative content along with a button or similar selectable GUI element that is intended to result in pilot acknowledgment of the notification 400 or other interaction with the system 10. In this regard, if the pilot selects the selectable GUI element associated with the notification 400 or interacts with any other monitored component or portion of the flight deck or onboard avionics as described above and/or depicted in FIG. 3, then the pilot incapacitation monitoring process does not advance from the initial stage (208) and resets, restarts or otherwise reinitializes to the concurrent monitoring (202, 204, 206).

Figure 5:
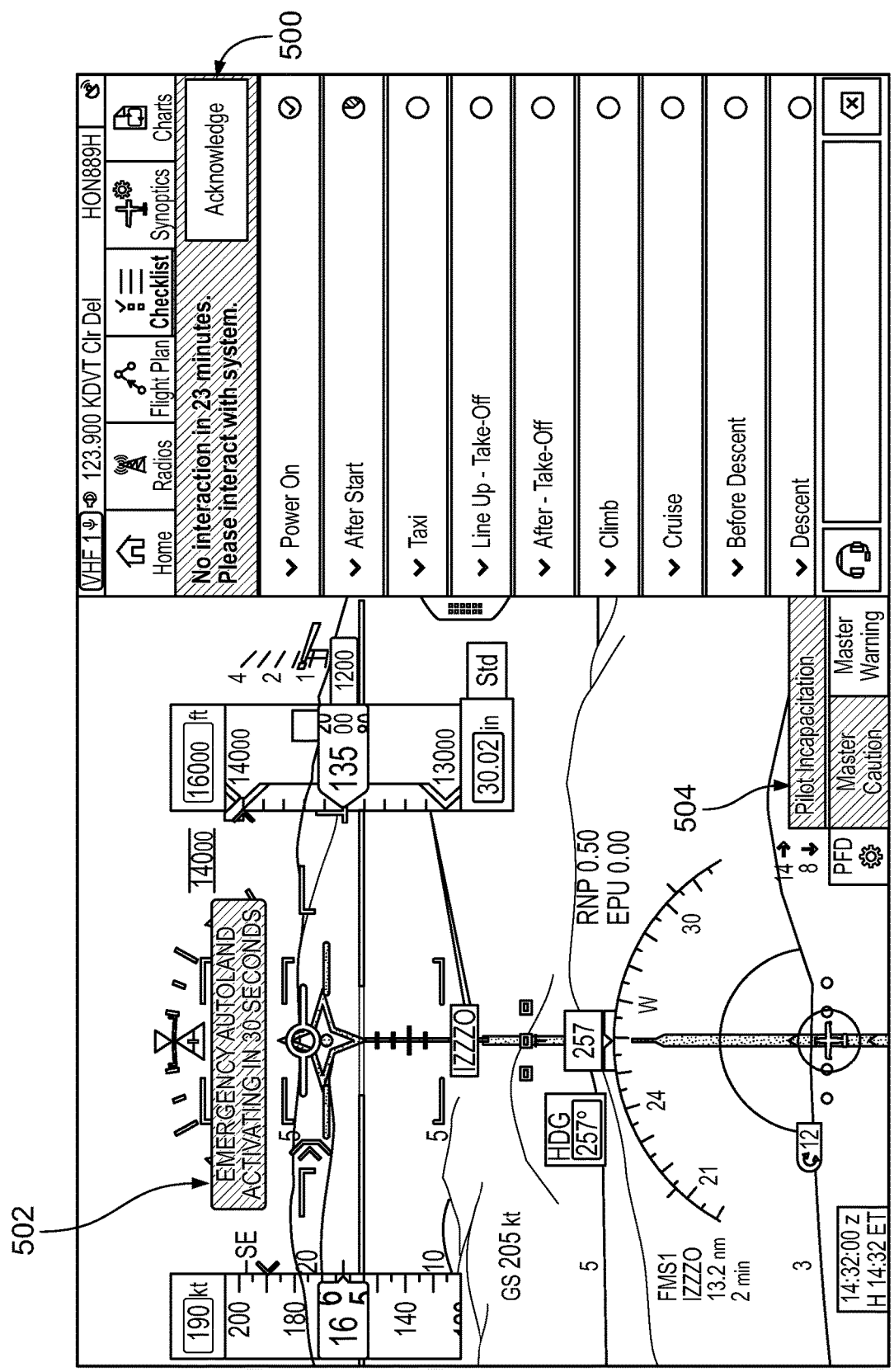

In the absence of any additional pilot interaction within a threshold period of time during the first stage of the autoland activation (step 210), the pilot incapacitation monitoring process advances to a second stage of the autoland activation (step 212). In this regard, the pilot incapacitation monitoring process may initiate an initial activation timer associated with the first stage of the autoland activation (208), and once a threshold period of time has elapsed without the pilot interacting with the system 10, the pilot incapacitation monitoring process may progress through one or more additional stages to provide a continuous and escalating series of prompts for pilot confirmation to determine whether the pilot is still conscious. For example, as shown in FIG. 5 with reference to FIG. 4, the initial notification 400 associated with the first stage may be dynamically updated to provide an updated notification 500 that is displayed or otherwise rendered on or overlying a primary flight display (PFD) or another avionic display. In exemplary embodiments, the updated GUI notification 500 is rendered or otherwise depicted using a color or another visually distinguishable characteristic for graphically or visually indicating a heightened level of urgency (e.g., yellow). Additionally, in the second stage of the autoland activation, in addition to the notification 400, 500 provided at or near a periphery or perimeter of a display, another text box, pop-up window, or another suitable GUI element 502 may be displayed or otherwise rendered on or overlying the primary flight display (PFD) or another avionic display at a more central location that reduces the likelihood of the pilot failing to view or acknowledge the escalated GUI notification 502. As shown, the escalated notification 502 may include text that indicates the impending activation of the autoland functionality and provides a countdown timer or similar information indicative of the timeframe within which the pilot should respond. Additionally, a crew alerting system (CAS) notification 504 may also be provided that indicates the pilot should press the master caution button. In addition to visual alerts or notifications, the pilot incapacitation monitoring process may be configured to generate or otherwise provide aural or audible alerts concurrently to the displayed notifications.

If the pilot selects the GUI element associated with the notification 400 or interacts with any other monitored component or portion of the flight deck or onboard avionics as described above and/or depicted in FIG. 3, then the pilot incapacitation monitoring process does not advance from the second stage (212) of the autoland activation and resets, restarts or otherwise reinitializes to the concurrent monitoring stage (202, 204, 206). In the illustrated embodiment of FIG. 2, in the absence of any additional pilot interaction within a threshold period of time during the second stage of the autoland activation (step 214), the pilot incapacitation monitoring process detects a pilot incapacity condition and automatically activates or otherwise initiates the autoland functionality (step 216). Thereafter, the controller architecture 12 autonomously and automatically operates the aircraft towards landing as described above in the context of FIG. 1.

Figure 6:
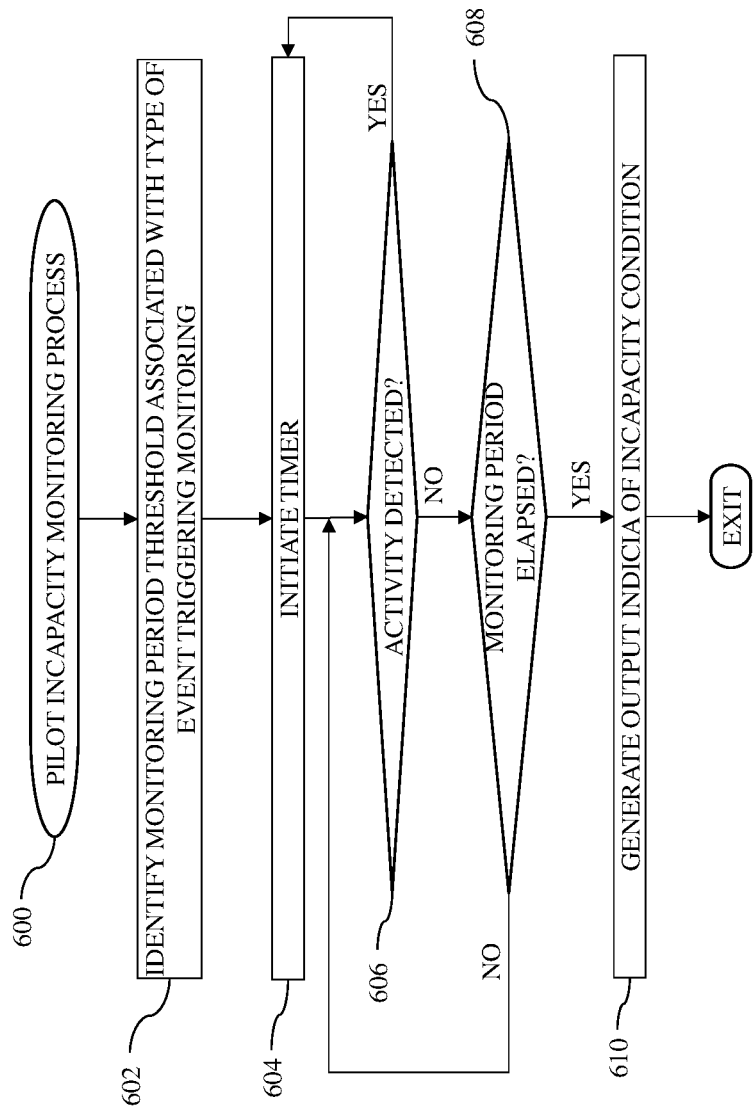
FIG. 6 is a flow diagram illustrating an exemplary pilot incapacity monitoring process suitable for implementation by the guidance system of FIG. 1 in accordance with one or more exemplary embodiments.

FIG. 6 depicts an exemplary embodiment of a pilot incapacity monitoring process 600 suitable for implementation by a flight guidance system or other aircraft system to detect potential incapacitation by a pilot. The various tasks performed in connection with the illustrated process may be implemented using hardware, firmware, software executed by processing circuitry, or any combination thereof. For example, in one or more embodiments, the steps of the pilot incapacity monitoring process 600 are embodied in computer-executable programming instructions or other data for execution that are stored or otherwise maintained in a data storage element, such as a memory (e.g., RAM memory, ROM memory, flash memory, registers, a hard disk, or the like) or another suitable non-transitory short or long term storage media. When read and executed by a processing system (e.g., controller architecture 12), the instructions cause the processing system to execute, perform or otherwise support the pilot incapacity monitoring process 600 and the related tasks, operations, and/or functions described herein. It should be appreciated that the pilot incapacity monitoring process 600 may include any number of additional or alternative tasks, the tasks need not be performed in the illustrated order and/or the tasks may be performed concurrently, and/or the pilot incapacity monitoring process 600 may be incorporated into a more comprehensive procedure or process having additional functionality not described in detail herein. Moreover, one or more of the tasks shown and described in the context of FIG. 6 could be omitted from a practical embodiment of the pilot incapacity monitoring process 600 as long as the intended overall functionality remains intact.

In one or more embodiments, the flight guidance system 10 and/or the controller architecture 12 initiates the pilot incapacity monitoring process 600 in response to detecting or otherwise identifying occurrence of an event that triggers monitoring for pilot incapacity, such as, for example, the aircraft ascending above a minimum armed height or other minimum altitude threshold associated with the process 600, the occurrence of an emergency event, the occurrence of a nominal event, or the like. In this regard, the pilot incapacity monitoring process 600 may be initiated more than once during flight and multiple instances of the pilot incapacity monitoring process 600 may be performed concurrently, as depicted in FIG. 2.

The pilot incapacity monitoring process 600 begins by identifying or otherwise determining the monitoring period threshold for inactivity based on the type of event that triggered the pilot incapacity monitoring process 600 (task 602). For example, when the pilot incapacity monitoring process 600 is triggered by crossing a minimum altitude threshold or a change in flight phase, the pilot incapacity monitoring process 600 identifies the current flight phase of the aircraft as triggering the incapacity monitoring and identifies the monitoring period threshold associated with the current flight phase (e.g., using a lookup table or the like). In this regard, the monitoring period threshold may vary depending on the flight phase of the aircraft to reflect anticipated increases and/or decreases in pilot activity based on the changes in expected pilot workload with respect to flight phase. When the pilot incapacity monitoring process 600 is triggered by an emergency event or a nominal event, the pilot incapacity monitoring process 600 identifies the monitoring period threshold associated with the particular type of event (e.g., using a lookup table or the like). In this regard, the monitoring period threshold may vary depending on the type of emergency event or nominal event in a manner that is commensurate with the level of severity or operational significance of the respective event.

After identifying the monitoring period threshold, the pilot incapacity monitoring process 600 continues by initiating a timer or similar feature and monitoring one or more components onboard the aircraft for a user input within the identified monitoring period threshold (tasks 604, 606). In this regard, when a user input is received at one of the monitored onboard components or systems, the pilot incapacity monitoring process 600 detects pilot activity and reinitiates the timer (task 604). In the absence of a user input at one of the monitored onboard components or systems, the pilot incapacity monitoring process 600 detects or otherwise identifies when the elapsed time associated with the timer (or the current value of the timer) is greater than the identified monitoring period threshold associated with the triggering event (task 608). When no user input is detected at one of the monitored onboard components or systems within the identified monitoring period threshold, the pilot incapacity monitoring process 600 generates or otherwise provides output that indicates a potential pilot incapacity condition (task 610). For example, the pilot incapacity monitoring process 600 may provide one or more output signals to an automated autoland activation process that automatically initiates activation of autoland functionality.

Figure 7:
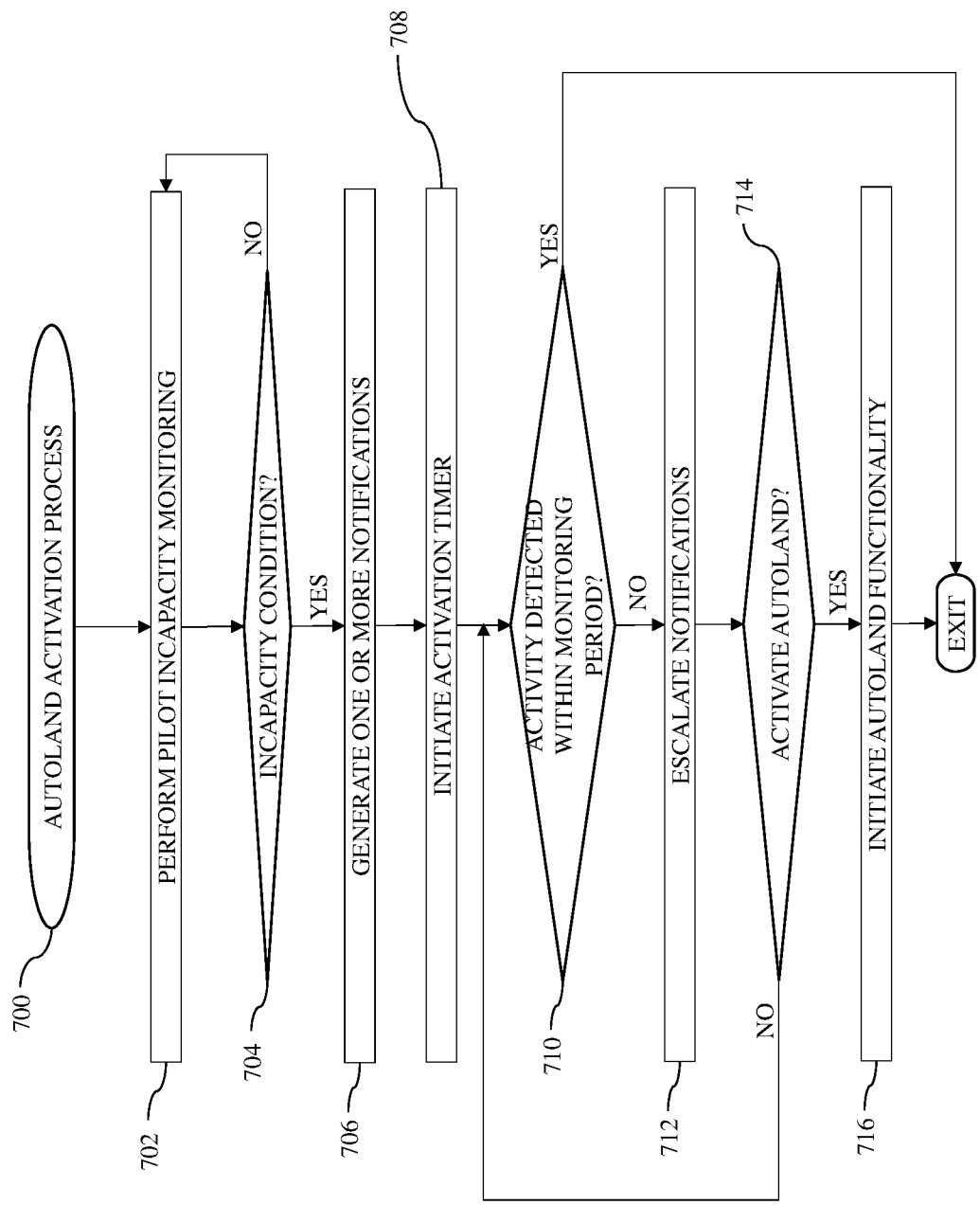
FIG. 7 is a flow diagram illustrating an exemplary autoland activation process suitable for implementation by the guidance system of FIG. 1 in connection with the pilot incapacity monitoring process of FIG. 6 in accordance with one or more exemplary embodiments.

FIG. 7 depicts an exemplary embodiment of an autoland activation process 700 suitable for implementation by a flight guidance system or other aircraft system in connection with the pilot incapacity monitoring process 600 of FIG. 6 to automatically activate autoland functionality in response to detecting potential incapacitation by a pilot. The various tasks performed in connection with the illustrated process may be implemented using hardware, firmware, software executed by processing circuitry, or any combination thereof. For example, in one or more embodiments, as described above, the steps of the autoland activation process 700 can be embodied in computer-executable programming instructions or other data for execution that are stored or otherwise maintained in a data storage element and when read and executed cause a processing system (e.g., controller architecture 12) to execute, perform or otherwise support the autoland activation process 700 and the related tasks, operations, and/or functions described herein. It should be appreciated that the autoland activation process 700 may include any number of additional or alternative tasks, the tasks need not be performed in the illustrated order and/or the tasks may be performed concurrently, and/or the autoland activation process 700 may be incorporated into a more comprehensive procedure or process having additional functionality not described in detail herein. Moreover, one or more of the tasks shown and described in the context of FIG. 7 could be omitted from a practical embodiment of the autoland activation process 700 as long as the intended overall functionality remains intact.

The illustrated embodiment of the autoland activation process 700 begins by performing pilot incapacity monitoring to detect or otherwise identify when a potential pilot incapacity condition exists (tasks 702, 704). For example, the autoland activation process 700 implemented by the flight guidance system 10 and/or the controller architecture 12 may initiate or otherwise perform the pilot incapacity monitoring process 600 to detect a potential pilot incapacity condition based on the output (task 614) of the pilot incapacity monitoring process 600. In this regard, when multiple instances of the pilot incapacity monitoring process 600 are being performed concurrently (e.g., flight phase monitoring in concert with an emergency and/or nominal event), the autoland activation process 700 may identify when any one of the instances of the pilot incapacity monitoring process 600 provide output indicia of a potential incapacity condition (e.g., by performing a logical OR operation on the output of the different instances of the pilot incapacity monitoring process 600) to detect a potential incapacity condition. That said, in other embodiments, the autoland activation process 700 may verify or otherwise confirm each of the concurrently active instances of the pilot incapacity monitoring process 600 provide output indicia of a potential incapacity condition (e.g., by performing a logical AND operation on the output of the pilot incapacity monitoring process 600) before detecting a potential incapacity condition. Such an implementation may avoid false positives in scenarios where different instances of the pilot incapacity monitoring process 600 are monitoring different onboard components and the pilot is busy interacting with an onboard component or system that is not monitored by one or more of the instances of the pilot incapacity monitoring process 600.

When a potential incapacity condition is detected, the autoland activation process 700 generates or otherwise provides one or more user notifications or alerts that are configured to prompt the pilot to act or otherwise confirm the potential incapacity (task 706). For example, as depicted in FIG. 4, one or more graphical notifications or alerts may be provided on one or more display devices onboard the aircraft to prompt the pilot to acknowledge the alerts or otherwise perform some action. Additionally, some embodiments of the autoland activation process 700 may generate auditory alerts in concert with graphical notifications.

The illustrated autoland activation process 700 is configurable to support multiple stages of progressively escalating alerts before activating the autoland functionality. In this regard, the autoland activation process 700 initiates an activation timer or similar feature that is utilized to track the duration of time since the potential incapacity condition was detected and monitors one or more onboard components or systems for any potential activity within the activation monitoring period (tasks 708, 710). The activation monitoring period(s) provide a continued window of opportunity for a pilot to respond before the autoland functionality is activated. In the absence of a user input or other activity by the pilot with respect to the monitored components within the activation monitoring period, the autoland activation process 700 automatically generates or otherwise provides one or more escalated user notifications or alerts that are configured to prompt the pilot to act more urgently or otherwise confirm the potential incapacity (task 712). For example, as depicted in FIG. 5, countdown timers, CAS alerts and/or the like may be added to one or more onboard displays to notify the pilot of the impending activation of the autoland functionality. Additionally, some embodiments of the autoland activation process 700 may generate auditory alerts with increasing volume and/or frequency. The loop defined by tasks 710, 712 and 714 may repeat indefinitely to provide multiple different stages of progressively and increasingly escalated alerts until the elapsed time associated with the activation timer (or the current value of the activation timer) is greater than a threshold period of time associated with activating the autoland functionality (task 714). Thereafter, the autoland activation process 700 automatically enables, initiates, or otherwise activates the autoland functionality in a fully automated and autonomous manner without any human inputs to facilitate automatically and autonomously landing the aircraft as described above in the context of FIG. 1.

Figure 8:
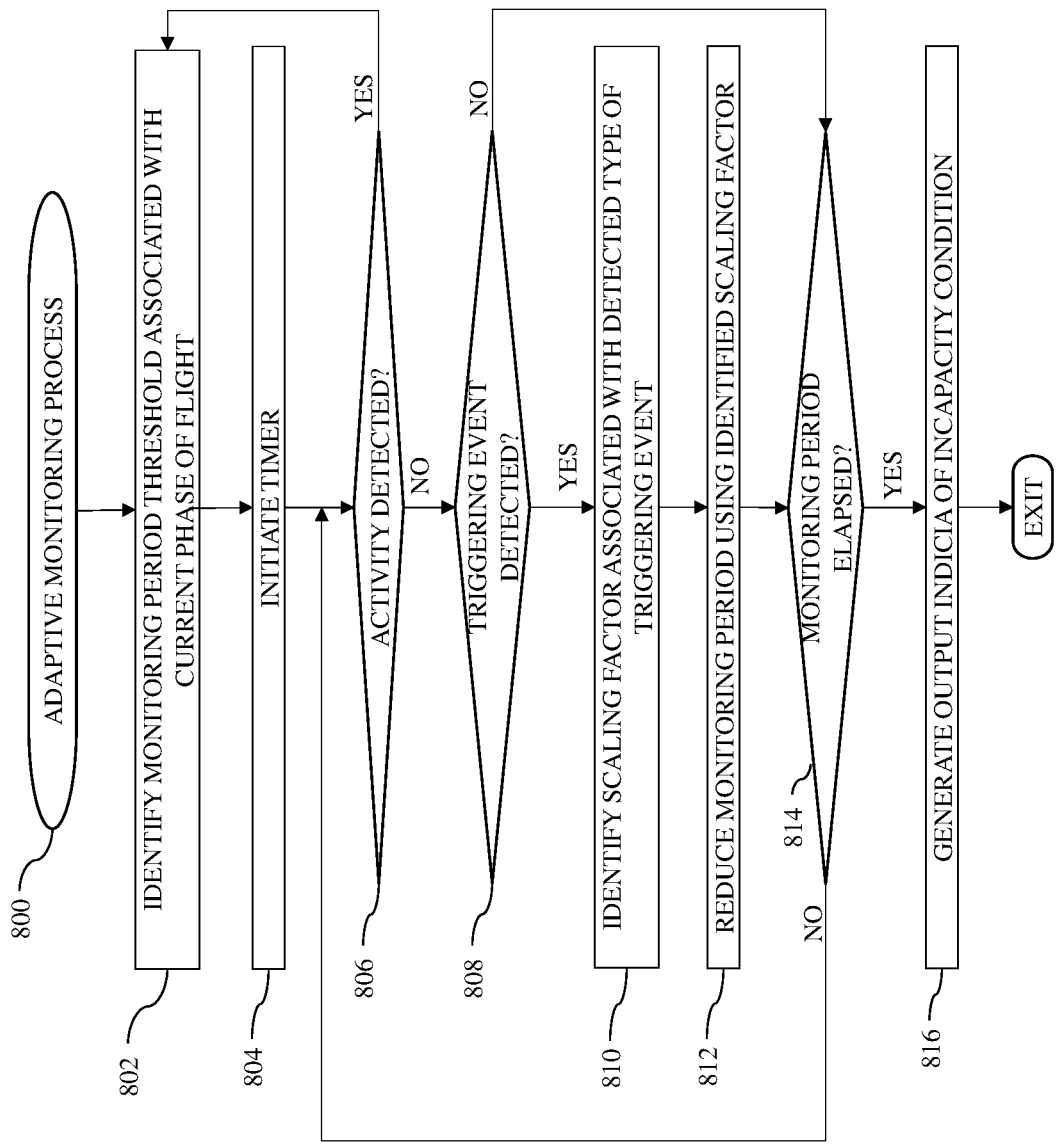
FIG. 8 is a flow diagram illustrating an exemplary adaptive monitoring process suitable for implementation by the guidance system of FIG. 1 in connection with the autoland activation process of FIG. 7 in accordance with one or more exemplary embodiments.
Figure 9:
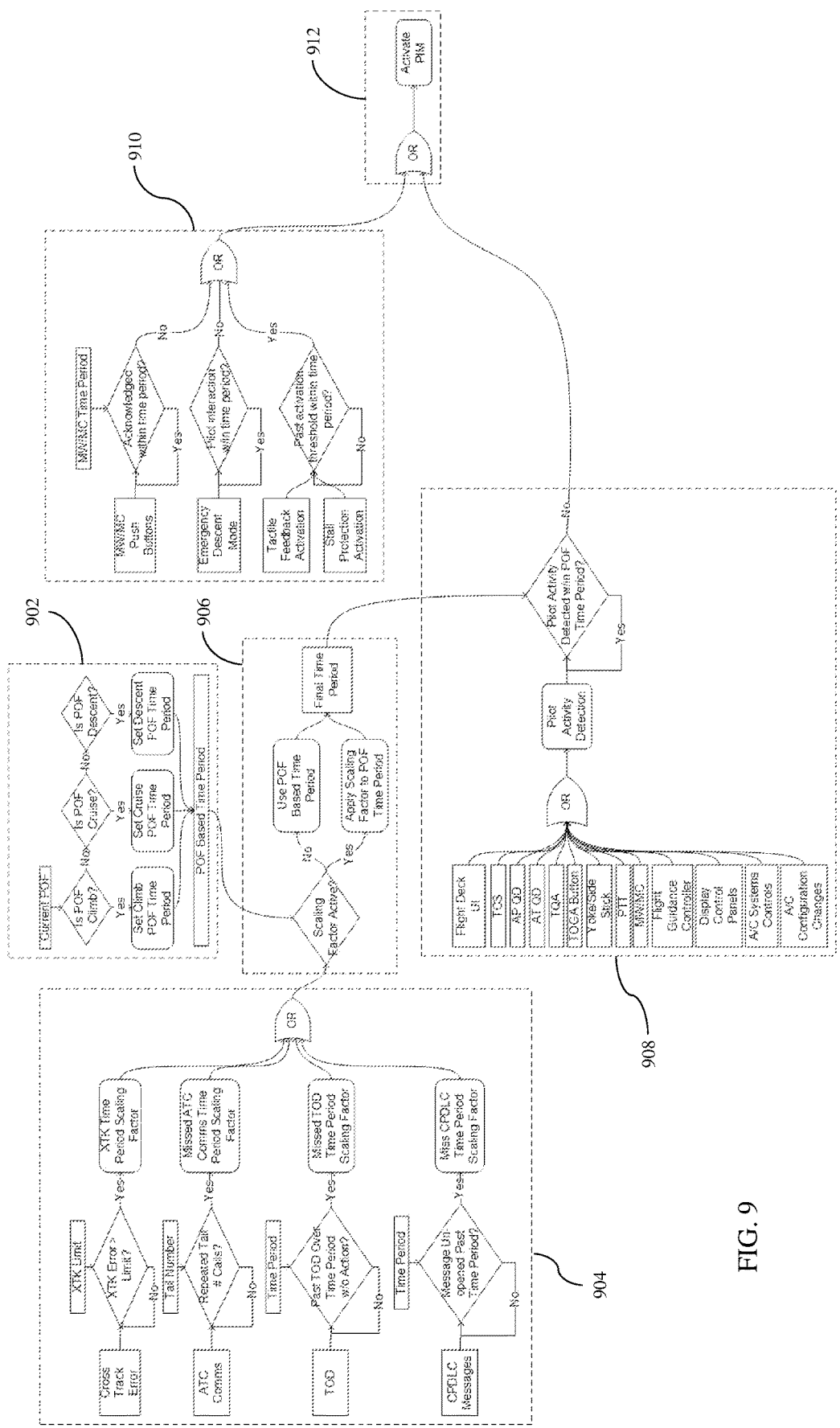
FIG. 9 depicts a schematic view of a pilot incapacity monitoring process that incorporates an adaptive monitoring process in accordance with one or more embodiments.

Referring now to FIGS. 8-9, in one or more exemplary embodiments, the monitoring period threshold for inactivity dynamically and adaptively varies to account for the concurrent overlapping triggering events. For example, rather than utilizing multiple concurrent monitoring periods, the occurrence of a particular triggering event may dynamically reduce a currently active monitoring period rather than initiating another parallel monitoring period. As a result of intelligently and adaptively reducing the incapacitation monitoring period, autoland functionality may be automatically initiated more quickly in scenarios where the absence of pilot activity in response to the occurrence or concurrence of particular triggering events or sequences thereof is more likely to be indicative of an incapacitation condition given the current operating context. In this regard, in response to detecting the occurrence of a nominal event or an emergency event during a particular phase of flight, the currently active phase of flight time-based monitoring period may be dynamically reduced by a scaling factor. In practice, the scaling factor may be specific to or otherwise associated with the particular type of detected triggering event, such that the reduction in the monitoring period is adaptive to suit the level of significance of the particular type of detected triggering event. For example, the scaling factor associated with an emergency event may be configured to reduce the currently active phase of flight time-based monitoring period by a greater amount than the scaling factor associated with a nominal event, such that the autoland activation process responds more aggressively to a stall condition or a depressurization event than a cross track error or flight past the top of descent.

FIG. 8 depicts an exemplary embodiment of an adaptive monitoring process 800 suitable for implementation by a flight guidance system or other aircraft system to detect potential incapacitation by a pilot. In this regard, some embodiments may implement the adaptive monitoring process 800 in connection with the autoland activation process 700 of FIG. 7 (e.g., by performing the adaptive monitoring process 800 at task 702) to automatically activate autoland functionality in response to detecting a potential incapacitation condition of a pilot. For example, the adaptive monitoring process 800 may be utilized in lieu of, or alternatively, in addition to, the pilot incapacity monitoring process 600. Still referring to FIG. 8, the various tasks performed in connection with the adaptive monitoring process may be implemented using hardware, firmware, software executed by processing circuitry, or any combination thereof. For example, in one or more embodiments, the steps of the adaptive monitoring process 800 can be embodied in computer-executable programming instructions or other data for execution that are stored or otherwise maintained in a data storage element and when read and executed cause a processing system (e.g., controller architecture 12) to execute, perform or otherwise support the adaptive monitoring process 800 and the related tasks, operations, and/or functions described herein. It should be appreciated that the adaptive monitoring process 800 may include any number of additional or alternative tasks, the tasks need not be performed in the illustrated order and/or the tasks may be performed concurrently, and/or the adaptive monitoring process 800 may be incorporated into a more comprehensive procedure or process having additional functionality not described in detail herein. Moreover, one or more of the tasks shown and described in the context of FIG. 8 could be omitted from a practical embodiment of the adaptive monitoring process 800 as long as the intended overall functionality remains intact.

In a similar manner as described above, in one or more embodiments, the adaptive monitoring process 800 is initiated by the flight guidance system 10 and/or the controller architecture 12 in response to detecting or otherwise identifying occurrence of the aircraft ascending above a minimum armed height or other minimum altitude threshold or another event that triggers initiation of pilot incapacity monitoring in the context of the autoland activation process 700. The adaptive monitoring process 800 begins by identifying or otherwise determining the monitoring period threshold for inactivity based on the current phase of flight or other operational status of the aircraft (task 802). In this regard, as described above, different phases of flight may have different activity monitoring periods associated therewith that vary depending on the flight phase to reflect anticipated increases and/or decreases in expected pilot workload and corresponding pilot activity with respect to flight phase. For example, the activity monitoring period for a departure flight phase or an approach flight phase may be 5 minutes, while the activity monitoring period for the cruise flight phase may be 45 minutes. Similar to the pilot incapacity monitoring process 600, after identifying the monitoring period threshold for the current flight phase, the adaptive monitoring process 800 initiates a timer or similar feature and monitors one or more components onboard the aircraft for a user input within the identified monitoring period threshold (tasks 804, 806). When a user input is received at one of the monitored onboard components or systems, the adaptive monitoring process 800 detects pilot activity and repeats the tasks of identifying the activity monitoring period for the current flight phase before reinitiating the timer (tasks 802, 804). In this regard, when the aircraft flight phase changes, the adaptive monitoring process 800 dynamically updates the phase of flight-based activity monitoring period that functions as the baseline or reference monitoring period for the adaptive monitoring process 800 to reflect the current flight phase.

During the phase of flight-based monitoring, the adaptive monitoring process 800 detects, identifies or otherwise monitors for occurrence of a potential triggering event for the autoland functionality (task 808). In the absence of a triggering event during the phase of flight-based monitoring, the adaptive monitoring process 800 maintains the activity monitoring period for the current flight phase as constant and continually monitors onboard components for pilot activity until the phase of flight-based activity monitoring period has elapsed (task 814) in a similar manner as described above in the context of the pilot incapacity monitoring process 600 (e.g., task 608).

In response to detecting occurrence of a triggering event, the adaptive monitoring process 800 identifies, obtains, or otherwise determines a scaling factor associated with the detected triggering event and then dynamically adjusts or otherwise reduces the currently active phase of flight-based activity monitoring period using the scaling factor associated with the detected triggering event (tasks 810, 812). For example, the flight guidance system 10 and/or the controller architecture 12 may detect or otherwise identify occurrence of a nominal event that could be indicative of incapacity, such as, for example, at least a threshold amount of cross track error, greater than a threshold number of callouts from ATC for the flight identifier or tail number of the aircraft within a threshold period of time, flight past the top of descent (TOD) point, or received controller-pilot datalink communication (CPDLC) messages that are not opened or read within a threshold amount of time. Based on the type of nominal event detected, the adaptive monitoring process 800 identifies, obtains or otherwise determines a scaling factor associated with the particular type of nominal event, and then utilizes the scaling factor to reduce the active phase of flight-based activity monitoring period to obtain an adjusted, adaptive activity monitoring period, for example, by multiplying the active phase of flight-based activity monitoring period by the scaling factor. In one or more embodiments, the scaling factors associated with emergency events are less than the scaling factors associated with nominal events to facilitate more aggressive reductions to the current activity monitoring period in response to emergency events relative to nominal events, which are less likely to be an emergency or correlative with pilot incapacity.

In some embodiments, occurrence of nominal events that are more likely to be attributable to pilot incapacity may be utilized to reduce the monitoring period more aggressively and initiate autoland functionality, while nominal events that are less likely to be attributable to pilot incapacity (or more likely to be attributable to other factors) may result in a more relaxed adjustment to the monitoring period. For example, nominal events that are more likely to be attributable to pilot incapacity, such as greater than a threshold number of callouts from ATC for the flight identifier or tail number of the aircraft within a threshold period of time, absence of a pilot opening CPDLC messages within a threshold period of time or flight past the TOD point by at least a threshold amount of time or distance, may be associated with a scaling factor of 0.5 to reduce the active phase of flight-based activity monitoring period by a factor of two or fifty percent, while a lesser nominal event such as cross track error greater than a threshold may be associated with a scaling factor of 0.8 to reduce the active phase of flight-based activity monitoring period by twenty percent. Thus, in response to greater than a threshold number of callouts from ATC for the flight identifier or tail number of the aircraft within a threshold period of time and/or the absence of pilot annunciations with respect to the ATC communications within a departure flight phase having an associated activity monitoring period threshold of 5 minutes, the activity monitoring period may be dynamically reduced from 5 minutes to 2.5 minutes, thereby allowing autoland functionality to be automatically initiated 2.5 minutes earlier when the pilot is incapacitated during the departure flight phase. On the other hand, for a cross track error during the cruise flight phase having an associated activity monitoring period threshold of 45 minutes, the activity monitoring period may be reduced from 45 minutes to 36 minutes, thereby allowing autoland functionality to be automatically initiated earlier when the pilot is incapacitated during the cruise flight phase, but without unnecessarily escalating initiation of the autoland functionality and preemptively generating notifications when the pilot is not incapacitated.

In one or more embodiments, the loop defined by tasks 806, 808, 810, 812 and 814 repeats until pilot activity is detected or the monitoring period elapses without pilot activity. In this regard, in some embodiments, the active monitoring period may be progressively reduced in response to additional autoland functionality triggering events to initiate autoland functionality more quickly in an automated manner in response to a cascading sequence of successive triggering events without any pilot activity. For example, in response to greater than a threshold number of callouts from ATC for the flight identifier or tail number of the aircraft within a threshold period of time due to the absence of a pilot annunciation or acknowledgment of an audio communication, the ATC may transmit a CPDLC message to the aircraft to prompt a response or acknowledgment from the pilot. When the CPDLC message goes unread or unopened for longer than a threshold duration of time (e.g., task 808), the adaptive monitoring process 800 may further reduce the active monitoring period that was previously adjusted based on the absence of pilot annunciation using the scaling factor associated with the failure to respond to a CPDLC message (e.g., tasks 810, 812). For example, continuing the above example, in the absence of the pilot opening the CPDLC message within a threshold amount of time, the adjusted departure flight phase activity monitoring period of 2.5 minutes may be further reduced to 1.25 minutes (e.g., by multiplying the adjusted monitoring period by a scaling factor of 0.5 associated the CPDLC message nominal event).

Still referring to FIG. 8, once the current value of the timer or other feature tracking the duration of pilot inactivity is greater than the adjusted monitoring period is less than, the adaptive monitoring process 800 detects or otherwise determines that the monitoring period has elapsed without observing any pilot activity and generates or otherwise provides output that indicates a potential pilot incapacity condition (task 816). As described above, when no user input is detected at any one of the monitored onboard components or systems within the activity monitoring period threshold, the adaptive monitoring process 800 provides one or more output signals to the autoland activation process 700 that automatically initiates activation of autoland functionality, for example, by initiating an activation timer (e.g., task 708) and/or providing notifications or alerts to prompt the pilot to perform some action (e.g., task 706).

FIG. 9 depicts a schematic diagram of a pilot incapacity monitoring process 900 that incorporates the adaptive monitoring process 800 for phase of flight and nominal event incapacity monitoring in parallel with one or more emergency event-based instances of the pilot incapacity monitoring process 600. The pilot incapacity monitoring process 900 includes a phase of flight (POF) monitoring module 902 that is configured to receive or otherwise obtain indication of the current flight phase (e.g., from the FMS 36) and determine a reference activity monitoring period threshold based on the current phase of flight (e.g., "POF Based Time Period"). The pilot incapacity monitoring process 900 also includes a nominal event monitoring module 904 that is configured to monitor for occurrence of a particular nominal event, and in response to the occurrence of a nominal event, the nominal event monitoring module 904 outputs or otherwise provides a scaling factor associated with the detected type of monitoring event (e.g., "Cross Track Error (XTK) Time Period Scaling Factor," "Missed ATC Comms Time Period Scaling Factor," "Missed CPDLC Time Period Scaling Factor," etc.). The pilot incapacity monitoring process 900 includes an adaptive monitoring period adjustment module 906 that is configured to receive the current active phase of flight activity monitoring period threshold from the phase of flight monitoring module 902 and dynamically adjust the phase of flight activity monitoring period threshold in accordance with the detected nominal event type scaling factor(s) output by the nominal event monitoring module 904 in a similar manner as described above to obtain an adaptively adjusted monitoring period (e.g., "Final Time Period"). The adaptively adjusted monitoring period is provided to a pilot activity detection module 908 that is coupled to various onboard components and/or systems to receive signals or other indicia of a pilot interacting with a respective one of the onboard components and/or systems and verify or otherwise determine whether or not pilot activity occurs within the adaptively adjusted monitoring period output by the adaptive monitoring period adjustment module 906.

The illustrated pilot incapacity monitoring process 900 includes an emergency event monitoring module 910 that is configured to implement instances of the pilot incapacity monitoring process 600 with respect to different types of emergency events that may trigger automated activation of the autoland functionality, in a similar manner as described above in the context of FIGS. 2-7. The output of the emergency event monitoring module 910 is provided to an autoland activation module 912 that is configured to logically OR or otherwise combine the output of the emergency event monitoring module 910 with the output of the pilot activity detection module 908 to automatically initiate activation of autoland functionality in response to either the absence of pilot activity within the dynamically and adaptively adjusted phase of flight monitoring period or the absence of pilot activity within a threshold period of time following an emergency event. In this regard, by virtue of the modules 902, 904, 906, 908 of the pilot incapacity monitoring process 900 being configured to incorporate or otherwise implement the adaptive monitoring process 800, the pilot incapacity monitoring process 900 is capable of more quickly and intelligently responding to combinations or sequences of nominal events in the context of pilot inactivity with respect to the current flight phase and automatically initiating autoland functionality in the absence of an emergency event.

It should be appreciated that FIG. 9 merely depicts one simplified representation of the pilot incapacity monitoring process 900 for purposes of explanation and is not intended to be exhaustive or limiting. In this regard, practical embodiments may utilize different types, numbers and/or combinations of nominal events for triggering the dynamic and adaptive reduction of the phase of flight activity monitoring period, and the subject matter described herein is not limited to any particular type of triggering event for dynamically adjusting the monitoring period. Similarly, the examples provided above in the context of FIGS. 8-9 are not intended to be exhaustive or limiting, and the subject matter is not limited to any particular scaling factors, monitoring periods and/or thresholds for triggering dynamic adjustments.

For the sake of brevity, conventional techniques related to graphical user interfaces, autopilot, autothrottle, flight control systems, flight management systems, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of an aircraft, the method comprising:
   identifying a change in a flight phase of the aircraft;
   identifying a threshold monitoring period associated with the flight phase, wherein a duration of the threshold monitoring period varies depending on the flight phase;
   initiating a timer;
   identifying, during the flight phase, a second event different from the change in the flight phase;
   in response to occurrence of the second event, dynamically adjusting the threshold monitoring period by a scaling factor associated with an event type associated with the second event to obtain a reduced monitoring period, wherein the scaling factor varies depending on the event type;
   monitoring one or more components for user input within the duration of the reduced monitoring period;
   detecting a potential incapacity condition in an absence of user input within the reduced monitoring period when an elapsed time associated with the timer is greater than the duration of the reduced monitoring period; and
   automatically initiating activation of an autoland functionality associated with the aircraft in response to detecting the potential incapacity condition.

2. The method of claim 1, wherein automatically initiating activation comprises:
   initiating an activation timer;
   monitoring the one or more components for user input within an activation monitoring period after initiating the activation timer; and
   automatically activating the autoland functionality in the absence of user input within the activation monitoring period.

3. The method of claim 2, further comprising generating a graphical representation of a countdown timer on a display device prior to automatically activating the autoland functionality.

4. The method of claim 2, further comprising:
   generating an initial set of one or more user notifications or alerts in the absence of user input within the threshold monitoring period; and
   after generating the initial set of one or more user notifications or alerts, generating an escalated set of one or more user notifications or alerts prior to activation of the autoland functionality.

5. The method of claim 1, further comprising:
   identifying a second triggering event different from the change in the flight phase;
   identifying a second monitoring period associated with the second triggering event, wherein the second monitoring period is different from the threshold monitoring period; and
   monitoring a second set of one or more components for second user input within the second monitoring period associated with the second triggering event concurrent to monitoring the one or more components for user input within the threshold monitoring period associated with the flight phase, wherein:
   automatically initiating activation of the autoland functionality comprises verifying the absence of user input within the threshold monitoring period associated with the flight phase and a second absence of second user input within the second monitoring period associated with the second triggering event prior to initiating activation of the autoland functionality.

6. The method of claim 1, wherein the one or more components include one or more of: an autopilot quick disconnect button (AP QD), touch control steering (TCS), a throttle quadrant assembly (TQA), a takeoff/go around (TOGA) button, an autothrottle (AT) engage/disengage button, an autothrottle quick disconnect button (AT QD), a push-to-talk (PTT) button, a master warning/master caution (MW/MC) button, a yoke, a sidestick, a display control panel, an aircraft system control switch, an electrical system, a lighting system, a hydraulic system, a cabin pressurization system, a landing gear system, a speed brake system and a hardware controller associated with an aircraft configuration change.

7. The method of claim 1, wherein initiating the timer comprises initiating the timer for monitoring one or more components for user input after identifying the threshold monitoring period, wherein detecting the potential incapacity condition comprises detecting the potential incapacity condition when the elapsed time associated with the timer is greater than the duration of the threshold monitoring period.

8. The method of claim 7, further comprising reinitiating the timer when a user input is received at the one or more components.

9. The method of claim 1, further comprising reinitializing the monitoring the one or more components for user input within the duration of the threshold monitoring period associated with the flight phase when a pilot interacts with the one or more components.

10. The method of claim 1, wherein the threshold monitoring period comprises a flight phase-specific threshold monitoring time period for inactivity to detect the potential incapacity condition when there is no pilot activity within the flight phase-specific threshold monitoring time period during the flight phase.

11. A method of automatically activating an autoland functionality of an aircraft, the method comprising:
- identifying a current flight phase of the aircraft;
- identifying a duration of a threshold monitoring period associated with the current flight phase, wherein the duration of the threshold monitoring period varies depending on a flight phase type associated with the current flight phase;
- initiating a timer;
- monitoring one or more components onboard the aircraft for user input within the duration of the threshold monitoring period associated with the current flight phase;
- identifying, during the current flight phase, occurrence of a potential triggering event for the autoland functionality while monitoring the one or more components for user input within the threshold monitoring period associated with the current flight phase;
- in response to the occurrence of the potential triggering event, dynamically reducing the duration of the threshold monitoring period by a scaling factor associated with an event type associated with the potential triggering event to obtain a reduced monitoring period, wherein the scaling factor varies depending on the event type;
- detecting a potential incapacity condition in an absence of user input within the reduced monitoring period when an elapsed time associated with the timer is greater than the reduced monitoring period; and
- automatically initiating activation of the autoland functionality of the aircraft in response to detecting the potential incapacity condition.

12. The method of claim 11, wherein identifying the occurrence of the potential triggering event for the autoland functionality comprises identifying at least one of:
- a cross track error greater than a first threshold;
- a first absence of a pilot response to air traffic control (ATC) communications within a second threshold period of time;
- flight past a top of descent point by at least a third threshold;
- a second absence of a pilot response to a received controller-pilot datalink communication (CPDLC) message within a fourth threshold period of time; and
- greater than a fifth threshold number of callouts associated with the aircraft from ATC within a sixth threshold period of time.

13. A computer-readable medium having computer-executable instructions stored thereon that, when executed by a processing system, cause the processing system to:
- identify a first triggering event comprising a current flight phase associated with operation of an aircraft;
- identify a duration of a threshold monitoring period associated with the current flight phase, wherein the duration of the threshold monitoring period varies depending on a flight phase associated with the aircraft;
- initiating a timer;
- monitor one or more components onboard the aircraft for user input within the threshold monitoring period associated with the first triggering event;
- identify, during the current flight phase, occurrence of a second triggering event associated with operation of the aircraft different from a change in the flight phase while monitoring the one or more components for user input within the threshold monitoring period associated with the current flight phase;
- in response to the occurrence of the second triggering event, dynamically reduce the duration of the threshold monitoring period by a scaling factor associated with an event type associated with the second triggering event in response to the occurrence of the second triggering event to obtain a reduced monitoring period, wherein the scaling factor varies depending on the event type;
- detecting a potential incapacity condition in an absence of user input within the reduced monitoring period when an elapsed time associated with the timer is greater than the duration of the reduced monitoring period; and
- automatically initiate activation of an automated functionality of the aircraft in response to detecting the potential incapacity condition.

14. The computer-readable medium of claim 13, wherein:
- the automated functionality comprises an autoland functionality;
- the second triggering event comprises a nominal event; and
- the nominal event comprises at least one of: a cross track error greater than a first threshold, a first absence of a pilot response to air traffic control (ATC) communications within a second threshold of time, flight past a top of descent point by at least a third threshold, and a second absence of a pilot response to a received controller-pilot datalink communication (CPDLC) message within a fourth threshold of time.

* * * * *